I. H. PALMER.
Wind-Engine.
No. 8,235. Reissued May 14, 1878.
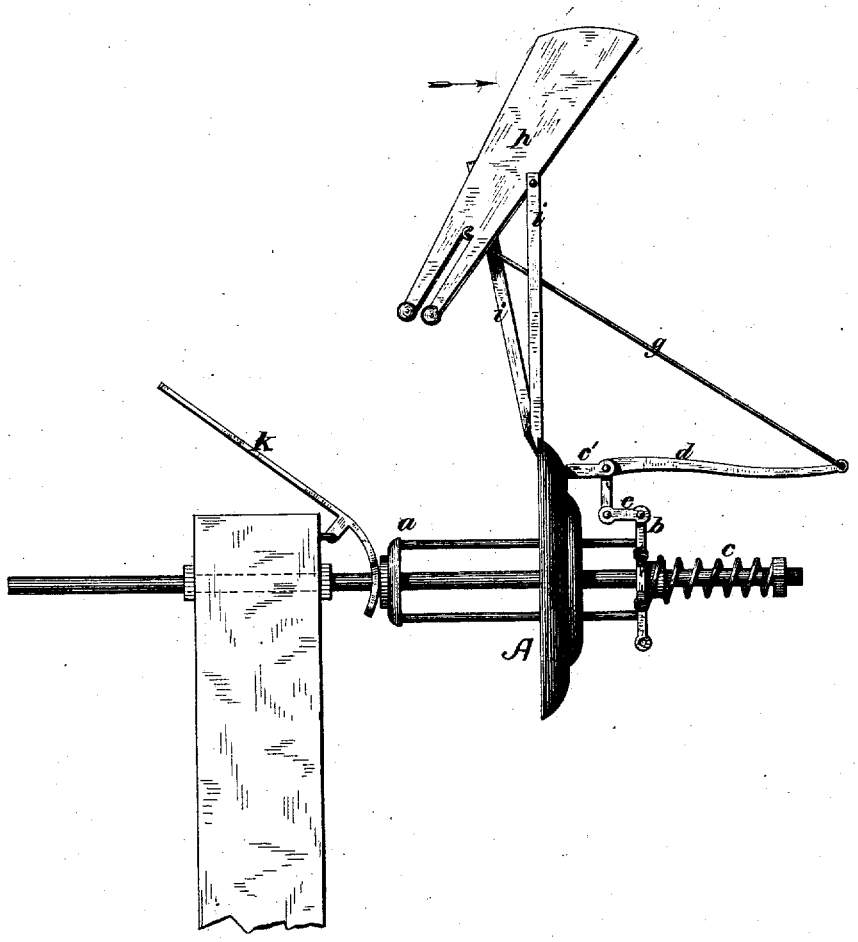
Witnesses.
Harry King
M. Lehmuchy
Inventor.
Isaac H. Palmer
By Hill & Ellsworth
His attys.
N. PETERS, PHOTO-LITHOGRAPHER, WASHINGTON, D. C.

UNITED STATES PATENT OFFICE.

ISAAC H. PALMER, OF LODI, WISCONSIN.

IMPROVEMENT IN WIND-ENGINES.

Specification forming part of Letters Patent No. 192,931, dated July 10, 1877; Reissue No. 8,235, dated May 14, 1878; application filed January 17, 1878.

*To all whom it may concern:*

Be it known that I, ISAAC H. PALMER, of Lodi, in the county of Columbia and State of Wisconsin, have invented a new and useful Improvement in Windmills; and I do hereby declare the following to be a full, clear, and exact description of the same, reference being had to the accompanying drawings, forming part of this specification.

My invention relates to windmills of that class in which the fans that compose the wheel swing in and out of the wind on axes at right angles to radial lines drawn through their centers, and which are held to the wind by means of spring-power; and the invention consists of certain improved details of construction, which will be hereinafter fully set forth and particularly claimed.

The head A of the wheel is fixed upon a rotating shaft in the usual manner. Through this head are rods, which extend from a disk, *a*, within the wheel and on the same shaft, to a spider, *d*, on the outside. This spider, like the disk, slides freely on the shaft. It is pressed inward by means of a spring, *c*, the outer end of which bears against a nut on the outer end of the shaft. On the outer side of the head are studs *c′ c′*, in which are pivoted bell-crank levers *d*. The inner and shorter arms of these levers are connected by rods or bars *e* to the spider *b*. The outer ends are connected by rods *g* to the pivoted wings *h*. These wings are held in arms *i i*, and when the spider is pressed out through the agency of the bell-crank lever and its connections the wing is thrown toward a position at right angles to the arms *i i*. The spider may be thus thrown outward against the spring *c* by means of a lever, *k*, acting on the disk, which may be supplied with a wire and operated in the usual manner. Obviously any excess of wind acting on the outer part of the wing in the direction of the arrow—that being greater than the part on the inside of the pivot—will tend to force the said wing against the force of the spring out of the wind.

The number of levers and arms will, it is clear, depend upon the number of wings.

I claim—

The disk *a*, spider *b*, and connecting-rods which pass through the head, in combination with the bell-crank lever *d*, connecting rods or bars *g*, wing *h*, and spring *c*, the parts being arranged to operate as set forth.

ISAAC H. PALMER.

Witnesses:

S. H. WATSON,

A. E. MOSS.